Figure 3:
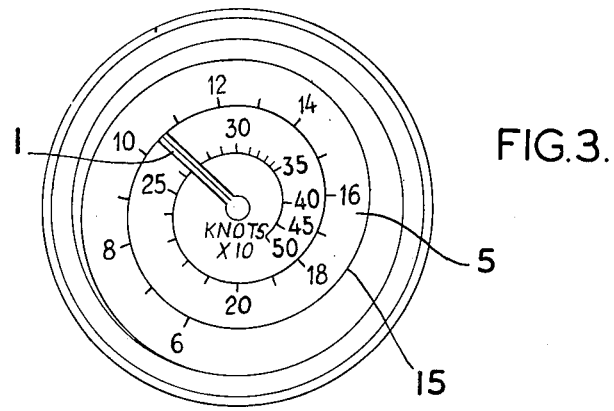

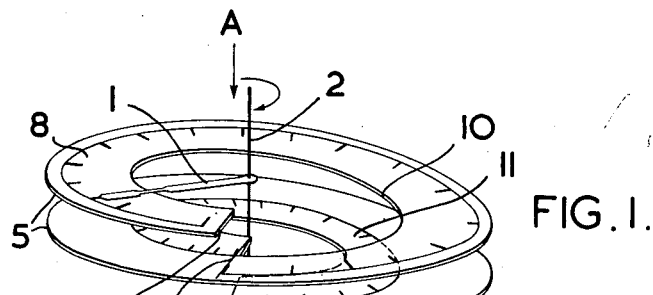
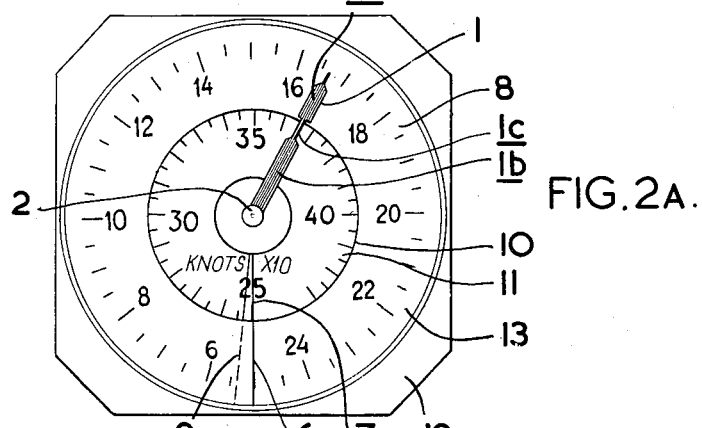
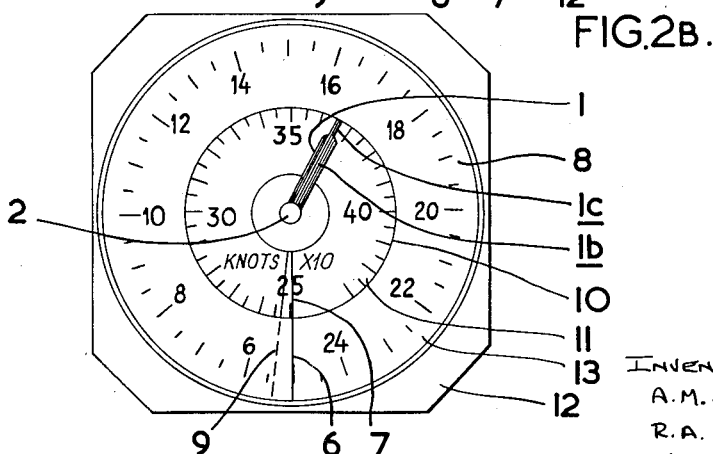

United States Patent Office 3,057,322
Patented Oct. 9, 1962

3,057,322
INDICATING INSTRUMENTS
Alastair Michael Adair Majendie, High Ridge, Winter Hill, Cookham Dean, England; Richard Abdiel Chorley, 61 Church St., Tewkesbury, England; and Harry Lowe, 3 Dale Walk, Bishops Cleeve, Cheltenham, England
Filed Feb. 6, 1961, Ser. No. 87,172
Claims priority, application Great Britain Feb. 8, 1960
9 Claims. (Cl. 116—129)

The present invention relates to indicating instruments of the kind (hereinafter referred to as instruments of the kind specified) having an indicating pointer and a scale, relatively rotatable about an axis in dependence upon the magnitude of a variable quantity to be indicated, the value of the variable being indicated by the relative angular position of the pointer and scale and indication of the full range of the variable quantity necessitating more than one complete revolution of the pointer and scale relative to one another.

In the past with such instruments it has been customary to provide two or more pointers, more or less after the fashion of the hands of a clock, the pointers being geared together in such a fashion that one rotation of a first pointer corresponds to only a fraction of a rotation of one or more other pointers, or, alternatively, a single pointer has been provided which may be read simultaneously against two or more concentric scales, the operator having to make the decision which of the readings is the correct one.

Multi pointer and multi-scale instruments of this character are acceptable where the indication can be read more or less at leisure and/or a mis-reading of the instrument will not involve dangerous or even catastrophic results. However, difficulty has arisen in connection with instruments of which this is not the case, for example altimeters and speed indicators for aircraft, where a misreading has on occasion in the past led to a dangerous situation.

It is an object of the invention to provide an instrument of the kind referred to having a single pointer and which is not susceptible to being mis-read to the same extent as a multi pointer or multi-scale instrument.

According to the present invention an instrument of the kind specified comprises a scale which extends angularly about said axis through more than 360°, the angularly overlapping parts of the scale being displaced from one another both radially and axially, the radial displacement serving to render all the angularly overlapping parts of the scale visible through a viewing aperture normal to said axis and the axial displacement being such that the outer parts of the scale lie closer to the viewing aperture than the inner parts, a pointer extending radially from the axis as far as the outermost part of the scale, and means for displacing the pointer and the scale axially relative to one another in dependence upon the magnitude of the variable quantity in such a manner that the outer end part of the pointer lies between the aperture and the outermost part of the scale when the magnitude of the variable quantity is appropriate to that part of the scale but lies behind the outer part of the scale when the magnitude of the variable quantity is such that the pointer is required to register with an inner part of the scale.

In one arrangement, the scale is marked on one surface of a helically-arranged strip (said surface will be directed towards the viewing aperture) and said means for displacing the scale and the pointer relative to one another operates to produce a displacement proportional to the relative angular deflection of the pointer and the scale. In another case, all the required axial displacement may be effected over a short range of angular movement of the pointer as it passes from one part of the scale to another, the parts of the scale being substantially planar. Such a movement could be effected for example by a suitable cam mechanism.

The strip may be arranged so that the outer edge thereof forms a true helix of constant pitch and radius, the inner edge being stepped inwards at the completion of each turn (the first turn lies closest to the viewing aperture) to permit the inner periphery of successive turns to be visible within the inner periphery or peripheries of the preceding turn or turns when viewed along the axis of the helix from the side of the strip on which the scale markings are provided. In another case the inner edge of the strip may be in the form of an elongated spiral to the radius of which continuously decreases.

Usually the scale will be fixed in the instrument and the pointer will be mounted on a shaft which is rotated about its longitudinal axis in dependence upon the magnitude of the variable quantity and is caused to move axially by said means for displacing the pointer and the scale axially.

Said means for displacing the pointer and the scale axially may comprise a screw threaded portion on a shaft on which the pointer is mounted, the thread co-operating with a bush having an internal screw thread, either the shaft or the bush being displaceable axially and the arrangement being such that the relative axial movement of the shaft and the bush is proportional to the relative angular movement thereof.

Figure 4:
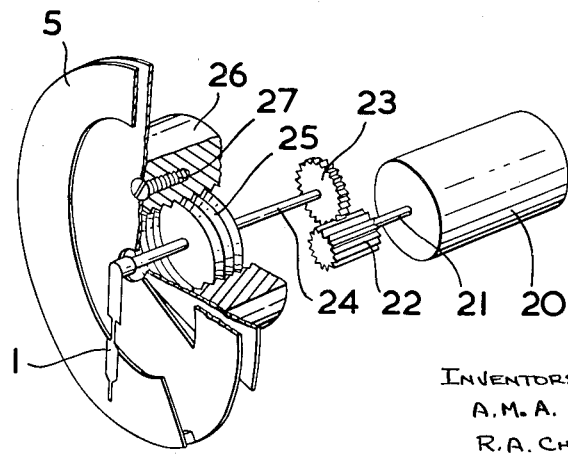

In an electrical instrument of the kind specified, the instrument as shown in FIGURE 4 will further include some form of transducer, for example a small electric motor, for converting an electric signal into relative angular motion of the scale and the pointer. Moving coil or moving iron movements might be used but as the pointer has to be driven through more than 360°, the movement would have to be coupled to the pointer through a gear train and this is not generally satisfactory. Where the pointer is mounted on a shaft which moves axially, the transducer will be coupled to the shaft by some coupling permitting the required axial movement of the shaft, for example a sliding gear.

Examples of instruments in accordance with the invention will now be described with reference to the accompanying drawing in which:

FIGURE 1 shows a diagrammatic perspective view of one form of scale structure, pointer and drive embodying the invention in an instrument, FIGURES 2A and B show two views of the face of the instrument shown in FIGURE 1 with the pointer deflected by different amounts, FIGURE 3 is a front elevation showing the scale and pointer in a modified form of the invention, FIGURE 4 shows a perspective view, partly cut away, of one form of drive mechanism which may be incorporated in the instrument shown in FIGURE 1.

Referring first to FIGURE 1, the instrument which is represented only diagrammatically, comprises a pointer 1 which is caused to rotate about an axis 2 by a drive movement 3 in accordance with the magnitude of a variable quantity to be indicated by the instrument. The drive movement 3 may take any convenient form and for example some form of small servo motor. A current or voltage varying in accordance with the magnitude of the variable quantity is supplied to the movement over the leads 4. Other forms of electrical movement may, of course, be employed as may other types of movement such as mechanically or pneumatically driven movements. The complete range of variation of the magnitude of the variable quantity corresponds to two complete rotations of the pointer 1 about the axis 2.

The instrument further includes a helical strip 5 which has two complete turns and is supported in the instrument so that the axis of the helix is coincident with the axis 2. A first section of the strip 5 which extends from the end 6 to the radial line 7 has a width which may conveniently be rather more than one-third of the outer diameter of the helix. This section is marked near its outer edge with the first part 8 of the required scale, the beginning of the scale lying adjacent to the end 6. At the radial line 7, the width of the strip is increased to nearly double that of the first section and accordingly the inner part of the second section of the strip 5 which extends from the radial line 7 to the other end 9 of the strip, is visible, inside the inner edge 10 of the first section, to an observer looking in the direction of the arrow A along the axis 2. The second section of the strip 5 is marked with the second part 11 of the required scale the graduations being positioned so that their outer ends lie just under the inner edge 10 of the first section of the strip 5 (see FIGURES 2A and B). The scale shown is one appropriate to an air speed indicator for an aircraft.

The pointer 1 is constructed to have two thicker portions 1a and 1b joined by a thinner neck 1c, the radius of the inner edge 10 of the first section of the strips being smaller than the distance from the axis 2 to the outer end of the neck 1c. In addition, for example in the manner described below with reference to FIGURE 4, there is provided some means for imparting axial movement in the direction of the arrow A to the pointer 1 as the magnitude of the variable quantity increases in such a manner that its axial spacing from the upper surface of the strip 5 remains approximately constant throughout the two complete revolutions corresponding to a full scale deflection of the instrument. The arrangement is such that, the pointer 1, as shown in FIGURE 1, initially lies with its outer end part 1a above the first part 8 of the scale, and this condition is maintained during the whole of the first 360° of revolution, for example as shown in FIGURE 2A. It will be seen that the outer end part 1a of the pointer 1 provides an unambiguous indication against the first part 8 of the scale. However when the radical line 7 is reached, the axial displacement of the pointer 1 has been such that the outer end part 1a passes below the end 6 of the strip and, to an observer looking along the axis 2 in the direction of the arrow A, the part 1a becomes hidden. As a result of this, an indication such as that shown in FIGURE 2B is obtained in which the neck 1c of the pointer registers against the second part 11 of the scale, again giving an unambiguous indication.

In conventional manner, the strip 5 and the movement 3 are mounted with an instrument case 12, in the manner shown in FIGURES 2A and B with the pointer 1 and the two parts 8 and 11 of the scale visible through a viewing window 13 lying in a plane normal to the axis 2. The spindle or shaft carrying the pointer 1 is mounted in suitable bearings in the case 12.

FIGURE 3 shows a view similar to those shown in FIGURES 2A and B of a slightly different form of instrument according to the invention. In this case, the inner edge 15 of the strip 5 is an elongated spiral instead of being stepped as is the case of the strip 5 in the model shown in FIGURES 1 and 2. The instrument is such that the ful scale deflection is more than two complete revolutions and is arranged so that the outer end of the visible part of the pointer 1 reads against a scale inscribed around the inner edge of the strip 5.

FIGURE 4 of the accompanying drawings shows, in slightly greater detail, the construction of the instrument described above with reference to FIGURES 1 and 2 and in particular shows one form of the means for displacing the pointer 1 axially relative to the scale. The instrument shown is one in which the drive movement is a small electric servo motor 20 the output shaft 21 of which drives a spur gear 22. The motor 20 is the transducer previously referred to for converting an electric signal into relative angular motion of the scale 5 and the pointer 1.

The gear 22 engages a sliding pinion 23 which is mounted on a shaft 24, the longitudinal axis of which is co-incident with the axis 2 of FIGURE 1. Besides carrying the pointer 1 the shaft 24 also carries a screw threaded portion 25, the pitch of the thread on which is equal to the pitch of the helix formed by the strip 5 on which the scale is inscribed. The portion 25 lies within a correspondingly internally threaded bush 26, which is secured for example by means of screws 27 to the strip 5. The hand of the threads on the portion 25 is such, having regard to the hand of the helix constituted by the strip 5, that the pointer 1 is displaced axially on rotation of the shaft 24 in the direction required to maintain its outer end at a substantially constant spacing from the outer surface of the strip 5, in the manner described above with reference to FIGURES 1 and 2. This construction also has the advantage that parallax is maintained at a minimum value as the pointer 1 moves around the strip 5. Here again for convenience, the case 12 and other conventional details of the instrument have been omitted and it will be appreciated that the motor 20, strip 5 and the bush 26 are all secured in convenient manner to the case which is provided with a viewing aperture in the normal way.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. An instrument having an indicating pointer and a scale which have a common axis, about which they are relatively rotatable to indicate the magnitude of a variable quantity, the instrument further having a case with a viewing aperture through which the pointer and scale are visible and comprising a scale which extends angularly about said axis through more than 360°, the angularly overlapping parts of the scale being displaced from one another both radially and axially, the radial displacement serving to render all the angularly overlapping parts of the scale visible through said viewing aperture and the axial displacement being such that the outer parts of the scale lie closer to the viewing aperture than the inner parts, a pointer which extends radially from the axis as far as the outermost part of the scale, and means for displacing the pointer and the scale axially relative to one another in dependence upon the magnitude of their relative rotation so that the outer end part of the pointer lies between the aperture and the outermost part of the scale when the magnitude of the variable quantity is appropriate to that part of the scale but lies behind the outer part of the scale when the magnitude of the variable quantity is such that the pointer is required to register with an inner part of the scale.

2. An instrument according to claim 1 in which there is a helically-arranged strip on the surface of which the scale is marked (said surface will be directed towards the viewing aperture) and said means for displacing the scale and the pointer axially relative to one another operates to produce a displacement proportional to the relative angular deflection of the pointer and the scale.

3. An instrument according to claim 2 in which the outer edge of the strip forms a true helix of constant pitch and radius, the inner edge being stepped inwards at the completion of each turn (the first turn lies closest to the viewing aperture) to permit the inner periphery of successive turns to be visible within the inner periphery or peripheries of the preceding turn or turns when viewed along the axis of the helix from the side of the strip on which the scale markings are provided.

4. An instrument according to claim 2 in which the inner edge of the strip is in the form of an elongated spiral the radius of which continuously decreases.

5. An instrument according to claim 1 in which the scale is fixed in the instrument and the instrument further includes a shaft on which the pointer is mounted and which is rotated about its longitudinal axis in dependence upon the magnitude of the variable quantity and said means for causing relative axial displacement of the pointer and the scale actuates said shaft to cause axial movement thereof.

6. An instrument according to claim 5 in which said means for displacing the pointer and the scale axially comprises a screw threaded part on said shaft and a bush fixed in the instrument, said part co-operating with said bush to cause axial displacement of the part and the shaft proportional to the relative angular movement thereof.

7. An instrument having an indicating pointer and a scale which have a common axis about which they are relatively rotatable to indicate the magnitude of a variable quantity, and driving means for causing relative angular rotation of the pointer and the scale in dependence upon the magnitude of an applied signal representing a variable quantity, the instrument further having a case with a viewing aperture through which the pointer and scale are visible and comprising a scale which extends angularly about said axis through more than 360°, the angularly overlapping parts of the scale being displaced from one another both radially and axially, the radial displacement serving to render all the angularly overlapping parts of the scale visible through said viewing aperture and the axial displacement being such that the outer parts of the scale lie closer to the viewing aperture than the inner parts, a pointer which extends radially from the axis as far as the outermost part of the scale, and means for displacing the pointer and the scale axially relative to one another in dependence upon the magnitude of the relative rotation so that the outer end part of the pointer lies between the aperture and the outermost part of the scale when the magnitude of the variable quantity is appropriate to that part of the scale but lies behind the outer part of the scale when the magnitude of the variable quantity is such that the pointer is required to register with an inner part of the scale.

8. An instrument according to claim 7 which is an electrical instrument adapted to respond to an electrical signal representing the magnitude of a variable quantity, and in which said driving means is an electromechanical transducer for converting said signal to a corresponding relative rotation of the pointer and the scale.

9. An indicating instrument for a variable quantity comprising a pointer, a scale, means mounting said pointer and said scale for relative movement of rotation of at least 540° about a common axis and for relative movement of translation along said axis, said scale comprising a non-planar strip bearing scale indicia providing readings to be indicated by said pointer, said strip being constructed to obscure a portion of said pointer over a portion of the path of said relative movement of rotation in such a manner that the visible end of said pointer indicates the correct value of the variable quantity and means to produce said relative movements in accordance with changes in the value of said variable quantity.

References Cited in the file of this patent

UNITED STATES PATENTS

| | | |
|---|---|---|
| 2,009,449 | Hedley | July 30, 1935 |
| 2,255,188 | Pieper | Sept. 9, 1941 |